United States Patent
Kalinowski

(10) Patent No.: US 12,127,223 B1
(45) Date of Patent: Oct. 22, 2024

(54) SYSTEMS WITH NETWORKED ELECTRONIC DEVICES AND SHARED RESOURCES

(71) Applicant: Apple Inc., Cupertino, CA (US)

(72) Inventor: David A. Kalinowski, Davis, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 17/240,763

(22) Filed: Apr. 26, 2021

Related U.S. Application Data

(60) Provisional application No. 63/038,047, filed on Jun. 11, 2020.

(51) Int. Cl.
  *H04W 72/51* (2023.01)
  *G06F 1/16* (2006.01)
  *H04W 64/00* (2009.01)
  *H04W 72/20* (2023.01)
  *H04W 84/18* (2009.01)

(52) U.S. Cl.
  CPC ............ *H04W 72/51* (2023.01); *G06F 1/163* (2013.01); *H04W 64/003* (2013.01); *H04W 64/006* (2013.01); *H04W 72/20* (2023.01); *H04W 84/18* (2013.01)

(58) Field of Classification Search
  CPC ..... H04W 12/08; H04W 12/47; H04W 88/04; H04W 8/005; H04W 4/023; H04W 4/24; H04W 76/10; H04W 76/15; H04W 88/10; H04W 12/63; H04W 76/12; H04W 12/106; H04W 56/0035; H04W 84/18; H04W 88/02; H04W 12/02; H04W 12/065; H04W 52/0274; H04W 64/00; H04W 92/18
  See application file for complete search history.

(56) References Cited

U.S. PATENT DOCUMENTS

| | | |
|---|---|---|
| 8,576,276 B2 | 11/2013 | Bar-Zeev et al. |
| 8,683,054 B1 * | 3/2014 | Karakotsios ........... H04N 23/64 |
| | | 709/228 |
| 8,786,675 B2 | 7/2014 | Deering |
| 9,122,321 B2 | 9/2015 | Perez et al. |
| 9,508,195 B2 | 11/2016 | Heuvel et al. |
| 9,551,873 B2 | 1/2017 | Zalewski |
| 9,818,225 B2 | 11/2017 | Mao et al. |
| 10,445,925 B2 | 10/2019 | Tokubo |
| 2018/0293041 A1 * | 10/2018 | Harviainen ........... H04N 13/332 |
| 2019/0370569 A1 * | 12/2019 | Gulati .................... G01S 13/931 |
| 2020/0050261 A1 * | 2/2020 | Lyren ...................... G06F 3/011 |

* cited by examiner

*Primary Examiner* — Kwasi Karikari
(74) *Attorney, Agent, or Firm* — Treyz Law Group, P.C.; G. Victor Treyz; Kendall P. Woodruff

(57) ABSTRACT

A system may include electronic devices such as a head-mounted electronic device, a cellular telephone, a wristwatch device, a computer, and other devices. During operation of the system, one or more of the electronic devices may gather information on the positions of the electronic devices. Information may also be gathered on the positions of objects and obstructions. This position information and/or other information such as information on which sensor resources are available in each of the devices may be used to determine which of the sensors of the electronic devices in the room should be shared. Shared sensors may gather information that is communicated wirelessly to other devices for use by those devices.

14 Claims, 11 Drawing Sheets

SYSTEMS WITH NETWORKED ELECTRONIC DEVICES AND SHARED RESOURCES

This application claims the benefit of provisional patent application No. 63/038,047, filed Jun. 11, 2020, which is hereby incorporated by reference herein in its entirety.

FIELD

This relates generally to electronic devices, and, more particularly, to electronic devices in networks.

BACKGROUND

Electronic devices such as head-mounted devices, cellular telephones, wristwatches, and computers, may have input-output devices for gathering input and supplying a user with output. In some environments, it may be challenging to gather desired information with an electronic device or to provide desired output with the electronic device.

SUMMARY

A system may include electronic devices such as a head-mounted electronic device, a cellular telephone, a wristwatch device, a computer, and other devices. During operation of the system, one or more of the electronic devices may gather information on the positions of the electronic devices. For example, a head-mounted device or other electronic device may use an image sensor such as a three-dimensional image sensor to scan a room containing electronic devices. The head-mounted device or other device may use this information and/or information from other sensors in the electronic devices to create a map of the room in which electronic device positions are identified. Information may also be gathered on the positions of objects and obstructions.

This position information and/or other information such as information on which sensor resources and/or other input-output device resource are available in each of the devices may be used to determine which of the sensors or other resources of the electronic devices in the room should be shared. For example, a head-mounted device may, by analyzing the positions of devices in a room, determine that the image sensor in the head-mounted device is partly or fully obstructed by a wall or other obstruction. The head-mounted device may also determine that the microphone of the head-mounted device is partly or fully obstructed by an obstruction. From the known device positions and known sensor resources of the devices in the room, the head-mounted device may, as an example, select a microphone in a first device that is adjacent to an object and may select an image sensor in a second device that is farther from the object but that has a clear line-of-sight to the object. The head-mounted device may then switch the microphone in the first device into use in place of a microphone in the head-mounted device and may switch the image sensor of the second device into use in place of an image sensor in the head-mounted device. Sound measured using the microphone may be presented to a user with a speaker in the head-mounted device and/or may otherwise be used in the system. Images captured using the image sensor in the second device may be displayed on a display in the head-mounted device and/or may otherwise be used in the system. This type of resource sharing may be used with wristwatches, cellular telephones, computers, and/or any other electronic devices in the system.

In some configurations, sensor readings from multiple devices may be combined to enhance sensor measurement quality. Obstructions can be avoided by using sensors in unobstructed devices. The system may switch dynamically between available sensors in different devices to help maximize measured signal strength. Triangulation procedures may be implemented. These procedures may exploit the use of multiple sensors in multiple devices to help determine the positions of objects, obstructions, and devices in an operating environment and/or may use multiple sensors to gather directional sensor data. In some configurations output may be switched between one device and another based on sensor information indicating that a user has moved relative to the devices.

If desired, a first component in a first device may emit a signal (sound, light, radio-frequency signals, etc.) and a second component may detect the signal after the signal has reflected from or otherwise interacted with an object being sensed. In this way, components in multiple different electronic devices may operate together to form a sensor.

DETAILED DESCRIPTION

Electronic devices can be used in networks. For example, a user with multiple electronic devices may use the sensors of these multiple devices together to enhance sensor measurement accuracy, to gather sensor data with one device that cannot be gathered with another device, and/or to otherwise exploit the positions and/or other attributes of the sensors in multiple devices to provide the user with enhanced functionality.

Figure 1:
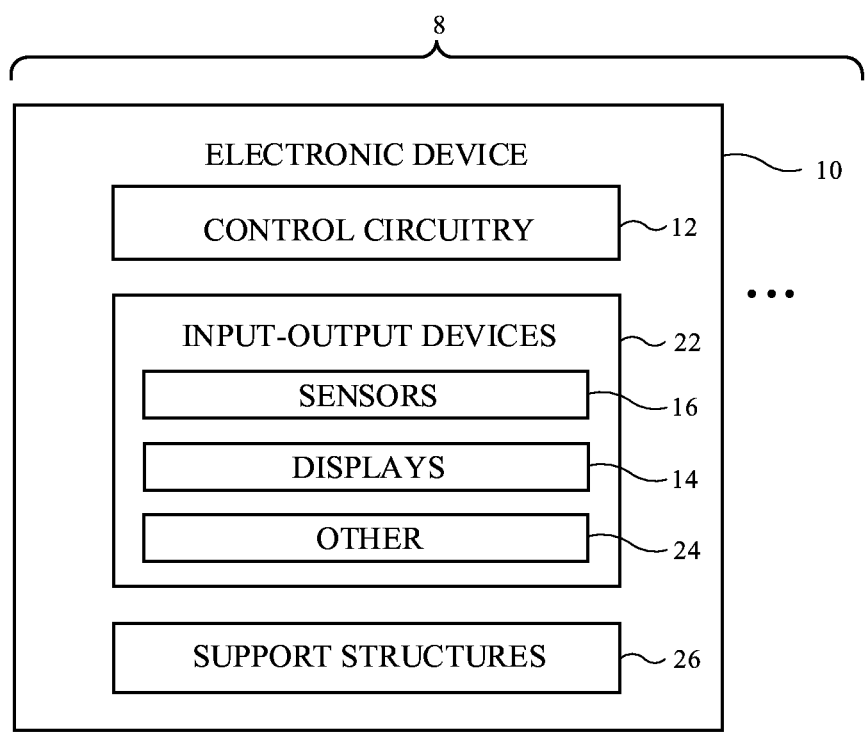
FIG. 1 is a schematic diagram of an illustrative electronic device in a system of electronic devices in accordance with an embodiment.

A schematic diagram of an illustrative system is shown in FIG. 1. As shown in FIG. 1, system 8 may include multiple electronic devices such as electronic device 10. The electronic devices of system 8 may include computers (e.g., desktop computers, laptop computers, tablet computers, etc.), cellular telephones, head-mounted devices (e.g. googles, glasses, helmets, and/or other head-mounted devices of the type that may have displays for displaying computer-generated content to a user), wristwatch devices, voice-controlled speaker devices (e.g., countertop speaker devices), stand-alone devices that contain a relatively limited number of sensors (e.g., a stand-alone microphone, stand-alone camera, stand-alone wireless sensor, etc.), accessory devices (e.g., computer mice, headphones, earbuds, keyboards, trackpads, joysticks and other controllers, etc.), and other electronic devices.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit sensor data, video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more optional displays such as displays 14. Displays 14 may be organic light-emitting diode displays, liquid crystal displays, or other suitable displays. Displays 14 may be used to display visual content for a user of device 10. The content displayed by displays 14 may contain still images and/or moving images and may include text, graphics, computer-generated content, images captured with cameras, and/or other visual content.

In some configurations, such as when device 10 is a head-mounted device, device 10 includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

In a configuration in which device 10 is a head-mounted device, the content that is presented on displays 14 may include virtual objects and other content. Virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles with an opaque display). In other configurations, an optical coupling system in a head-mounted device may be used to allow computer-generated content to be optically overlaid on top of a real-world image. As an example, device 10 may be a head-mounted device that has a see-through display system that provides a computer-generated image to a user through a beam splitter, prism, holographic coupler, or other optical coupler while allowing the user to view real-world objects through the optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar sensors, which are sometimes referred to as light detection and ranging sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), radio-frequency position sensors such as Ultra Wideband (UWB) circuitry, and/or other sensors. Sensors 16 and other input-output device resources may be shared by multiple devices 10 in system 8.

During operation of system 8, user input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Each electronic device 10 in system 8 may have a support structure such as a housing structure, as shown by illustrative support structure(s) 26 of FIG. 1. Structures 26 may include, for example, a head-mounted support structure configured to be worn on a user's head, may include a wrist strap to allow device 10 to be worn on a user's wrist, or may form a housing for a laptop computer, tablet computer, desktop computer, cellular telephone, a voice-controlled speaker, an accessory, or other electronic device. Structure 26 may support displays 14, sensors 16, other components 24, other input-output devices 22, and control circuitry 12. Structures 26 may be formed from polymer, glass, metal, fabric, leather, wood, or other natural materials, ceramic, other materials, and/or combinations of these materials.

Figure 2:
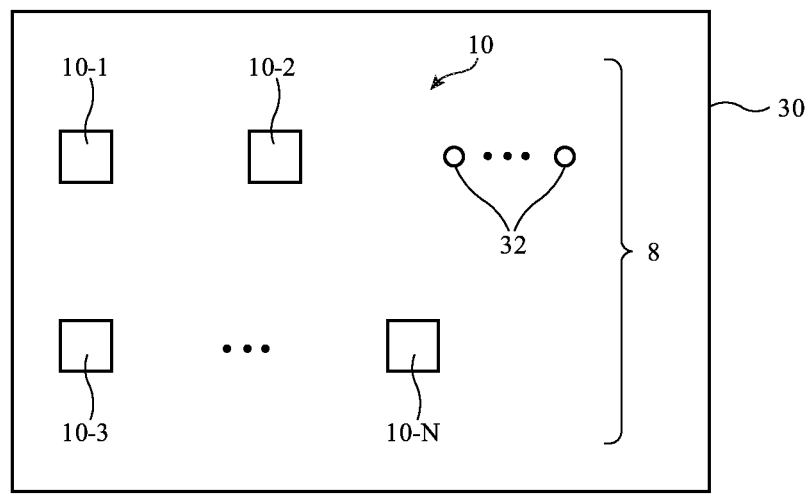
FIG. 2 is a diagram of an illustrative system of electronic devices operating cooperatively in an environment such as a room of a building in accordance with an embodiment.

As shown in FIG. 2, system 8 may include multiple electronic devices such as device 10 of FIG. 1. Communications circuitry in each of these electronic devices (e.g., wired communications circuitry and/or wireless communications circuitry) may allow these devices to communicate with each other directly and/or indirectly (e.g., through one or more intermediate devices). Information may be shared between some or all of the electronic devices in system 8 and may be used by one or more of the electronic devices in system 8.

In general, system 8 may include any suitable number of electronic devices 10 (e.g., at least two, at least three, at least four, at least five, at least ten, at least 20, fewer than 25, fewer than 15, fewer than 7, or other suitable number). In the example of FIG. 2, system 8 includes N devices (e.g., electronic devices 10-1, 10-2, 10-3 , . . . 10-N). Devices 10 may be all of the same type (e.g., each of devices 10 may be a cellular telephone), may be of different types (e.g., a head-mounted device, a cellular telephone, a tablet computer, a desktop computer, a voice-controlled speaker, a wristwatch, headphones, and/or other devices), may have similar or identical sensors 16, may have different sensors 16, may have shared output capabilities (e.g., multiple devices may have displays), may have output capabilities that differ significantly (e.g., one of the devices may have a speaker and another of the devices may have no speakers and may therefore be incapable of supplying audio output), may communicate wirelessly and/or via wired communications, may communicate with on-line equipment (e.g., one or more remote databases accessible over the Internet or other networks), may communicate with peer devices (e.g., other electronic devices 10 in system 8), may communicate only with paired devices, may communicate only with other devices 10 that have registered with an online service, may communicate with any devices that are within communications range, and/or may have other suitable properties.

System 8 may operate in system environment 30. System 8 may include electronic devices 10 that are located at widely spaced geographic locations (e.g., different buildings in different cities) and/or may include electronic devices that are located in close proximity to each other. Illustrative configurations in which devices 10 are located within an environment (environment 30) such as a building or a single room in a building may sometimes be described herein as an example.

Particularly in configurations in which devices 10 are located in close proximity to each other (e.g., in a single room or building), devices 10 may operate cooperatively while interacting with nearby animate and/or inanimate objects 32. For example, one device in environment 30 may have a microphone that receives sound from a person more clearly than the microphone in another device. This may be due to the positions of the different microphones relative to the person, due to the type of microphone being used in each device, due to microphone orientation, due to the presence of audio interference in environment 30, and/or due to other factors. Because the microphones are close in distance, the devices with the different microphones can communicate with each other over a local area network (e.g., a wireless local area network) and can share microphone data so that the microphone that is receiving the sound from the person most clearly may be switched into use in place of a microphone that is not receiving sound clearly.

As this example demonstrates, the local presence of devices 10 in environment 30 allows a given device (e.g., device 10-N) to leverage the sensors 16 and/or other resources (e.g., other input-output devices 22, other control circuitry 12, etc.) of one or more other devices 10 (e.g., device 10-1, device 10-2, device 10-3, etc.). For example, sensor resources or other input-output devices 22 from devices such as device 10-1, 10-2, 10-3, etc.) may be use to replace and/or supplement sensor resources or other input-output devices in device 10-N. The resources (e.g., the components in input-output devices 22) that are used to gather input and/or to supply output may be used based on any suitable criteria. For example, resources may be switched into use based on metrics that reflect signal quality, electronic device position (location in X, Y, and Z and/or angular orientation), the presence or absence of impairments (e.g., physical obstructions or other factors that may partly or fully prevent resources from operating effectively), the ability of resources to gather input and/or provide output with one or more users, and/or other factors. These metrics may be evaluated by a single device in system 8 and/or by multiple devices in system 8 and decisions as to which resources to switch into use may be made dynamically by one or more devices 10 in system 8. If desired, user input (e.g., manual user selection) may be used to switch the resources of a particular device or devices into use. Selected resources may be used by a single device (e.g., a selected microphone may be used to supply audio to a particular device 10 in system 8) or may be used by multiple devices (e.g., a selected microphone may supply two or more devices 10 in system 8 with audio). A single elected resource may be switched into use (e.g., a single microphone may actively gather audio for one or more devices 10 in system 8) or multiple selected resources may be switched into use (e.g., two or more microphones may be used to simultaneously gather signals for one or more devices 10 in system 8, a selected microphone and a selected image sensor may be used to gather signals for one or more devices in system 8, etc.).

The ability of system 8 to allocate input-output resources among devices 10 in this way allows power consumption to be reduced for one or more devices 10 and/or system 8. For example, both a first device and a second device may have a type of sensor that consumes a significant amount of power. The first device may be battery powered, whereas the second device may receive power over a wired connection (e.g. from a wall power source). When the second device is within the vicinity of the first device (e.g., when both devices are within the same room), the sensor of the second device can be operated in place of the sensor for the first device and data from this sensor may be provided to the first device. This arrangement allows the first device to conserve battery power while still gathering desired sensor measurements.

The ability of system 8 to share resources may also allow a given device to obtain sensor data that could not otherwise be obtained by the given device (e.g., because of an obstruction that is preventing a sensor in the given device from gathering desired data). Sensors and other resources may also perform better collectively than would be possible when operated individually, so by sharing sensor resources in system 8, overall performance for one or more devices 10 that are using the shared sensor data may be enhanced.

Figure 3:
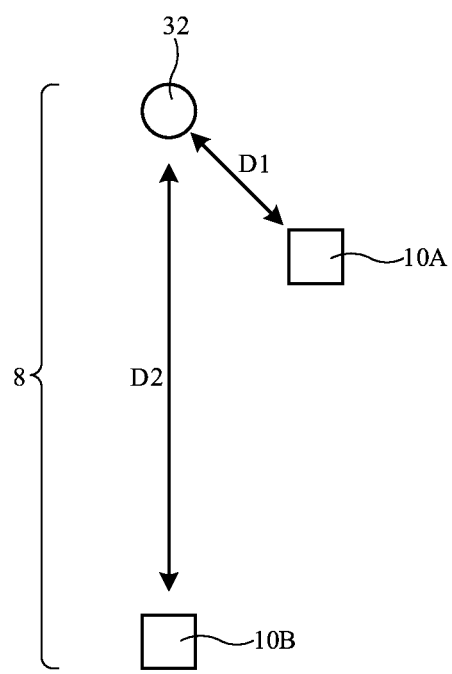
FIG. 3 is a diagram of an illustrative system with devices located at different distances from an object showing how sensor data may be shared between devices in accordance with an embodiment.

Consider, as an example, the arrangement of FIG. 3. As shown in FIG. 3, system 8 may be used in an environment with one or more non-device items such as illustrative object 32. Objects such as object 32 may be inanimate objects (e.g., pieces of furniture) or may be people (e.g., users of one or more of devices 10 in system 8 and/or other people). In the illustrative scenario of FIG. 3, a first electronic device 10 (device 10A) is separated from object 32 in system 8 by distance D1 and a second electronic device 10 (device 10B) is separated from object 32 in system 8 by a distance D2 that is greater than distance D1. Due to the positions of devices 10A and 10B relative to object 32 (e.g., due to larger distance of device 10B from object 32 than device 10A), the sensors of device 10A may be able to gather sensor data more satisfactorily than the sensors of device 10B. As an example, device 10B may be running a communications application that uses a microphone in device 10B to gather audio from a person (e.g., object 32 in this example). Because device 10A is closer to the person, the microphone of device 10A may detect the audio of the person more clearly than the microphone of device 10B, so the measured audio from device 10A can be selected for use by device 10B in place of the microphone of device 10B. Depending on the placement of the microphones of devices in system 8, one microphone may be better located for capturing noise signals than another and may therefore be best to use to supply input to a noise cancellation algorithm. During operation of system 8, a user may manually select an optimum microphone (or other sensor) to use, the positions of devices 10A and 10B (and, if desired, additional devices) relative to device 32 may be used by system 8 (e.g., by control circuitry 12 in device 10A and/or device 10B) to determine which microphone to use, a signal quality factor may be evaluated for each device to determine which microphone to use (e.g., system 8 may measure sensor performance characteristics such as microphone signal strength, audio signal-to-noise-ratio, or other characteristics in real time and may select which microphone to use based on these performance characteristics), etc.

Figure 4:
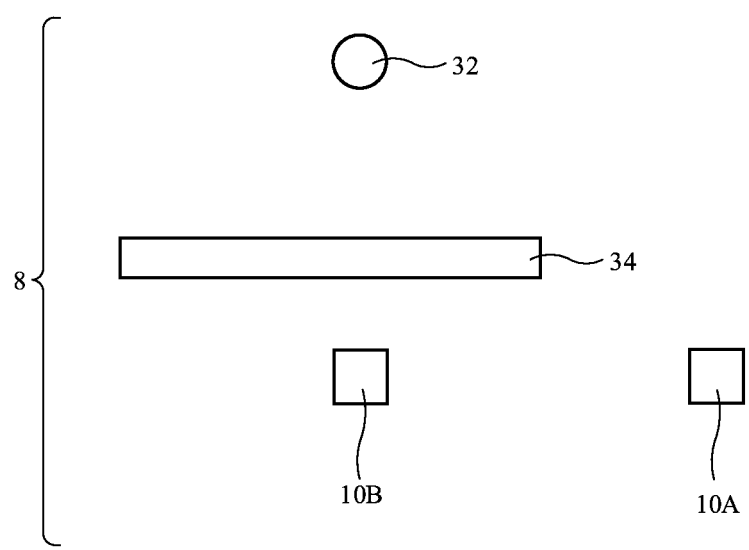
FIG. 4 is a diagram of an illustrative system with multiple devices showing how sensor data from one device may be shared with another device to avoid an obstruction in accordance with an embodiment.

Another illustrative example of a system with multiple devices is shown in FIG. 4. In the example of FIG. 4, device 10A is obstructed (partly or fully) by obstruction 34. Obstruction 34 may, for example block light, radio-frequency signals, or other electromagnetic radiation, may bock audio (sound), and/or may otherwise block access of the sensors in device 10B to object 32. As a result, one or more of the sensors in device 10B is not able to operate as well as one or more corresponding sensors in device 10A. As an example, device 10B may have optical sensors such as proximity sensors, image sensors (e.g., visible light and/or infrared cameras), three-dimensional sensors (e.g., structured light sensors, time-of-flight sensors, etc.), and/or other sensors using light (images) from object 32. Due to the presence of obstruction 34 (e.g., a physical obstruction such as a wall or portion of a device housing, etc.), an image sensor or other optical sensor in device 10B may not be able to satisfactorily capture an image of object 32. Device 10A in the FIG. 4 example is not blocked from object 32 by obstruction 34. As a result, system 8 may switch an image sensor or other optical sensor of device 10A into use in place of the blocked sensor of device 10B (e.g., this sensor may have a clear line of sight to object 32 and may be used to, in effect, "look around corners" to view object 32 for device 10B). In some scenarios, device 10B (e.g., a head-mounted device) may also experience difficulties in gathering audio (microphone readings) from object 32 due to the presence of obstruction 34 and may, based on the known position of another electronic device with a microphone adjacent to object 32, switch the microphone of that device into use. The image or other desired sensor readings obtained by device 10A (and, if desired, microphone readings from an additional device in system 8) may be provided (e.g., wirelessly or via other communications paths) to device 10B in real time (as an example).

In the event that the operation of the image sensor or other sensor in device 10A becomes impaired (e.g., if obstruction 34 moves between object 32 and device 10A), the image sensor of device 10B may be switched back into use (if not obstructed) or another device's sensor can be used. Sensor swapping operations such as these can be used to accommodate any type of sensor obstruction (sound, radio-frequency signals, light for a three-dimensional sensor or proximity sensor, etc.).

One of more of the devices 10 of system 8 (e.g., device 10A and/or device 10B) may use information on the positions of devices 10 and other items in environment 30 such as object(s) 32 and obstruction(s) 34 (e.g., a two-dimensional or three-dimensional map of the contents of environment 30 obtained from an image sensor in a head-mounted device and/or other sensor data) in determining which sensor(s) to switch into use. For example, device 10B can determine that obstruction 34 is present between object 32 and device 10B using position information (e.g., the positions of devices 10, object 32, and obstruction 34). Device 10B can also determine that device 10A is not obstructed by obstruction 34 and can therefore make sensor measurements for device 10B. This position information may be gathered using position sensors and other sensors 16 in devices 10 (e.g., radio-frequency position sensors, ultrasonic position sensors, three-dimensional image sensors, two-dimensional image sensors, and/or other optical sensors, etc.). System 8 (e.g., devices 10A and 10B) may automatically use the sensors of an unobstructed device (e.g., device 10A) in place of an obstructed device (e.g., device 10B) in response to a user-initiated request or other request to use the obstructed sensor of device 10B to make a measurement.

Figure 5:
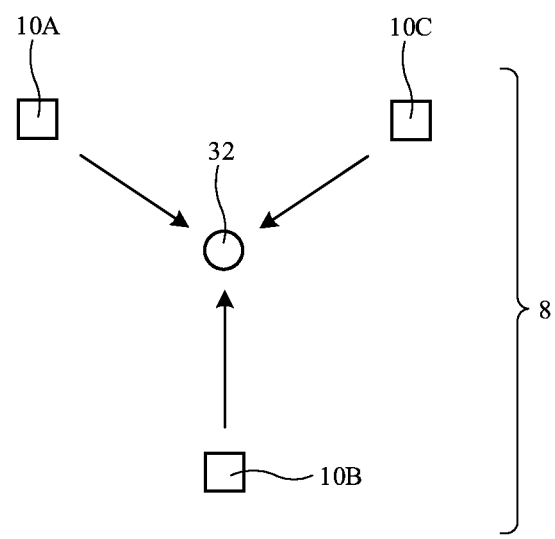
FIG. 5 is a diagram of an illustrative system with multiple devices showing how sensor data from multiple devices that are at different orientations with respect to an object may be combined in accordance with an embodiment.

In some scenarios, the positions of devices 10 allow different devices to take sensor readings on object 32 from different perspectives. As shown in FIG. 5, for example, devices 10A, 10B, and 10C may have three-dimensional image sensors (e.g., structured light sensors or other depth sensors) that capture three-dimensional images of object 32 (e.g., a person's face or other object) from three different directions. The distances between devices 10A, 10B, and 10C and object 32 may be identical (as an example), but due to the different orientations of devices 10A, 10B, and 10C relative to object 32, devices 10A, 10B, and 10C can each gather at least some information that the remaining devices cannot gather. System 8 (e.g., the control circuitry of one or more of the devices) can share the gathered data from some or all of devices 10A, 10B, and/or 10C with some or all of these devices. For example, device 10B may gather information from the three-dimensional image sensors of devices 10A and 10C to help device 10B reconstruct a complete three-dimensional model of object 32. These sensor sharing operations may occur, for example, during a live communications session when the three-dimensional model of a person is being captured to animate an avatar of the person and/or these sensor sharing operations may be used to share static three-dimensional image data (as examples).

Figure 6:
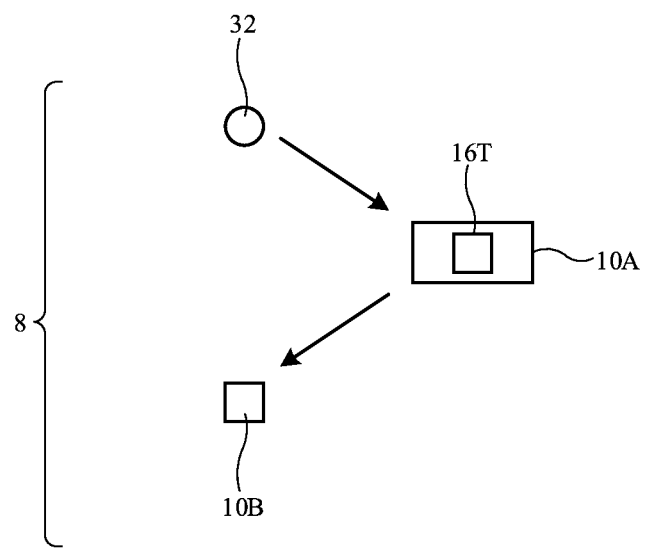
FIG. 6 is a diagram of an illustrative system with multiple devices showing how sensor data may be gathered by a device with a given sensor and shared with a device that does not include the given sensor in accordance with an embodiment.

FIG. 6 is a diagram of system 8 in an illustrative configuration in which different devices 10 in system 8 have different input-output resources. This allows devices with relatively larger amounts of input-output resources to share these resources with devices with relatively fewer input-output resources. In the example of FIG. 6, device 10A contains a sensor (sensor 16T) of a type that is not contained by device 10B. Sensor 16T may be, for example, a microphone, an image sensor, a proximity sensor, a touch sensor, a force sensor, a three-dimensional sensor, a fingerprint sensor, and/or other sensor 16. Although device 10B does not contain this type of sensor, device 10A can share sensor 16T with device 10B. In particular, device 10A may gather sensor data with sensor 16T and may share this sensor data with device 10B in real time (e.g., wirelessly), allowing device 10B to operate as though device 10B contained sensor 16T. For example, device 10B may not contain a fingerprint sensor, but can gather fingerprint measurements using a fingerprint sensor (e.g., sensor 16T) of device 10A. Because device 10B can use the sensor functionality of device 10A to extend the capabilities of device 10B, device 10B can be reduced in size, weight, and complexity (e.g., by omitting sensor 16T from device 10B). In general, one or more sensors from one or more devices 10 in system 8 may be shared with a given device 10 in this way. For example, a first electronic device may not have an image sensor, may not have a microphone, and may not have a depth sensor. Nevertheless, the first device may use an image sensor in a second device, a microphone in a third device, and a depth sensor in a fourth device to gather sensor measurements.

Figure 7:
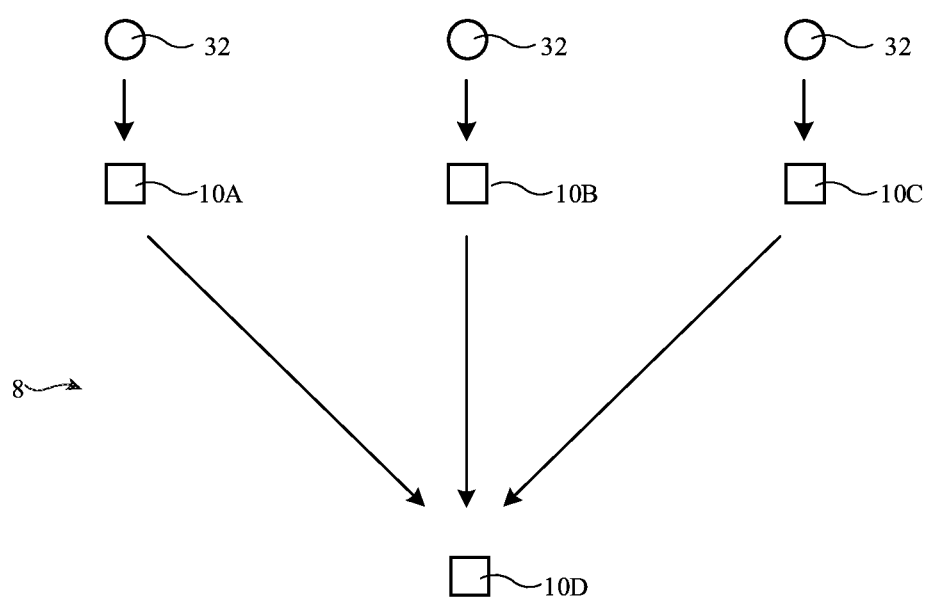
FIG. 7 is a diagram of an illustrative system with multiple devices in which sensor data from multiple sensors is used in operating the system in accordance with an embodiment.

Another illustrative example is shown in FIG. 7. System 8 of FIG. 7 includes four devices 10A, 10B, 10C, and 10D. Device 10D may use sensors 16 in each of devices 10A, 10B, and 10C in gathering sensor data. Each of devices 10A, 10B, and 10C may be situated in a different position within a room or other environment. For example, objects 32 in system 8 of FIG. 7 may correspond to people who are talking. Each of devices 10A, 10B, and 10C may be located adjacent to a particular one of these people and may have a microphone that is adjacent to that person. The proximity of each of the microphones to a particular person enhances the ability of that microphone to satisfactorily gather audio from that person. During operation, device 10D may gather audio from each of devices 10A, 10B, and 10C using the microphones of these devices and may use some or all of this data. For example, device 10D may switch between the microphones of different devices based on a factor such as audio signal strength and/or one or more other criteria. With this type of approach, the loudest microphone signal at any given time may be switched into use. Sharing sensor resources from devices at different locations may help ensure that a satisfactory audio signal is being gathered at any given time, even if the source of sound in the environment is moving (e.g., between different people). If desired, this type of approach may be used for sharing image sensors and/or other sensors 16 in addition to or instead of sharing microphones.

Figure 8:
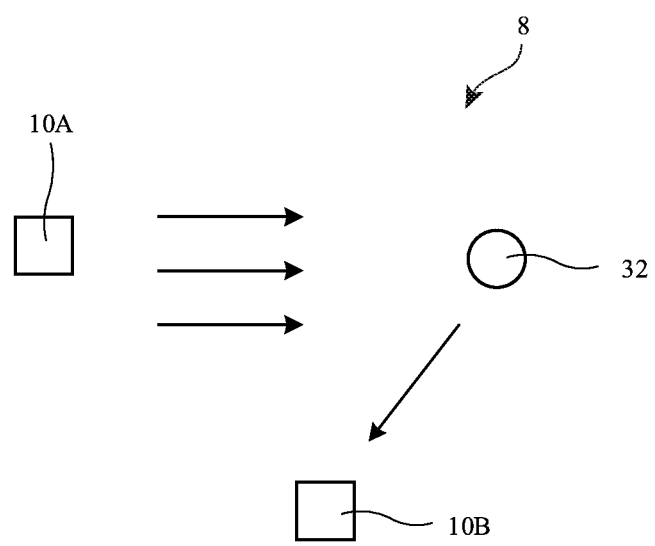
FIG. 8 is a diagram of an illustrative system with multiple devices in which sensor data is gathered by emitting a signal with one of the devices and gathering signals with another of the devices.

In the illustrative configuration for system 8 that is shown in FIG. 8, multiple devices are operating together to gather a sensor measurement. Each of the devices may, as an example, perform only part of the operations needed to complete a given sensor measurement.

Consider, as a first example, the capturing of a three-dimensional image with a structured light sensor. In this type of measurement, an array of infrared dots or other structured light output is used to illuminate a subject (e.g., object 32 of FIG. 8) and a corresponding image is captured and analyzed to produce a three-dimensional map (three-dimensional image) of the subject. It may be challenging for a single device 10 to both produce structured light and captured images. Accordingly, one device (e.g., device 10A in the example of FIG. 8) may produce the structured light (e.g., an array of infrared dots) to illuminate object 32 using a dot projector or other structured light source in device 10A, whereas another device (e.g., device 10B in the example of FIG. 8) may use an image sensor to capture an image of the object being illuminated by the array of dots. Device 10A, 10B, and/or other device(s) in system 8 may analyze the captured image data to produce a three-dimensional image of object 32.

As a second example, consider the capturing of an infrared image of object 32. Device 10A may have an infrared light-emitting diode that serves as an infrared illuminator (e.g., an infrared camera flash). Device 10A can illuminate object 32 while device 10B uses an infrared image sensor to capture an infrared image (e.g., a two-dimensional infrared image) of the illuminated object.

As a third example, consider the measurement of the location of object 32 using an ultrasonic sensor. Device 10A may have a speaker or other transducer that produces an ultrasonic signal. This signal may reflect from object 32 and be measured using a microphone array in device 10B. In this way, device 10B may detect the position of object 32. Together, the ultrasonic output component of device 10A and the microphones of device 10B form an ultrasonic position sensor. If desired, multiple different devices 10 may contain ultrasonic signal sources for producing ultrasonic probe signals and/or multiple different devices 10 may contain microphones for measuring resulting ultrasonic reflections (echoes from object 32) that are processed to determine object locations, object shapes, etc.

Figure 9:
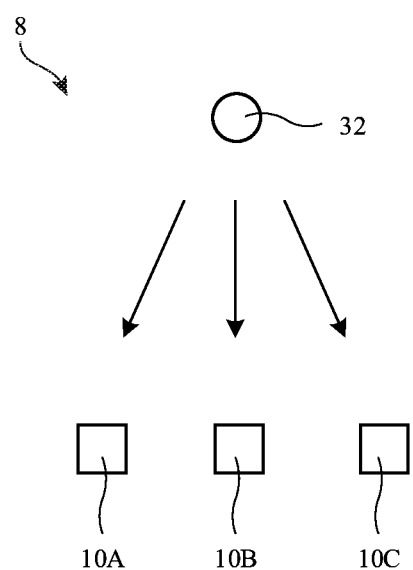
FIG. 9 is a diagram of an illustrative system in which sensor data from multiple devices is gathered and combined to enhance sensor data quality in accordance with an embodiment.

In the illustrative configuration of system 8 that is shown in FIG. 9, devices 10A, 10B, and 10C are each gathering the same type of measurement (e.g., a measurement on object 32 and/or other objects in a given operating environment such as a room in a building, etc.) and this measurement data is being averaged or otherwise combined (e.g., using a weighted average, etc.).

Each of devices 10A. 10B, and 10C of FIG. 9 may, as an example, have a respective color ambient light sensor that gathers a color ambient light measurement. Because of the different positions of devices 10A, 10B, and 10C within their operating environment (e.g., a room), each device will generally measure a different ambient light value. By combining these different values, local variations in the operating environment (e.g., local shadowing of one or more sensors, the localized presence of reflective objects or objects of particular colors adjacent to one or more sensors, etc.) are averaged out, thereby helping to provide an averaged ambient light reading that is a satisfactory reflection of the overall ambient light conditions in the operating environment of system 8.

As another, example, devices 10A, 10B, and 10C of FIG. 9 may each have an accelerometer. Device 10A may be, for example, a user's cellular telephone, device 10B may be the user's wristwatch, and device 10C may be a head-mounted device being worn by the user. Each of the accelerometers may take a reading in parallel and these readings may be correlated to determine the overall acceleration of the user and the user's devices. For example, if a user is in a moving vehicle, localized variations in accelerometer readings from each of these devices may be averaged out as part of the correlation process, thereby revealing satisfactory information on the motion of the moving vehicle. During use of the devices, the wristwatch accelerometer may exhibit measurement variations due to arm movements, the head-mounted device accelerometer may exhibit measurement variations due to head movements, and the cellular telephone accelerometer may exhibit variations due to movement of the cellular telephone while the cellular telephone is being carried in the user's hand or pocket. Each of these types of variations may be different and therefore may be relatively uncorrelated with each other. By using correlation techniques, a common (correlated) accelerometer signal can be derived from these measurements, which corresponds (in this example) to the movement of the vehicle in which the user is traveling with the wristwatch, cellular telephone, and head-mounted device.

As a further example, devices 10A, 10B, and 10C of FIG. 9 may each have a microphone that is used to make audio measurements. The audio measurements that are being made may be similar (e.g., devices 10A, 10B, and 10C may effectively be measuring the same sound source). Nonetheless, by combining multiple audio streams, the overall quality of the audio measurement being made by system 8 may be enhanced (e.g., the signal-to-noise ratio of the audio signal may be better when three sets of audio data are processed together to form a single overall audio sample). Moreover, triangulation processes may be used (e.g., an array of microphones may use triangulation to help directionalize the sensitivity of the microphones to sound).

The combined measurement made with devices 10A, 10B, and 10C may be used by one or more of these devices or other electronic devices in system 8. For example, device 10A may have a display and the color cast and/or brightness of the display may be adjusted based on a color ambient light sensor measurement that is made using combined sensor data from devices 10A, 10B, and 10C.

As these examples demonstrate, rather than switching between different sensor measurements associated with different devices 10 (e.g., rather than choosing between sensors based on signal strength measurements or other criteria) it may, in certain environments, be effective to uses a weighted average technique, a signal correlation technique, and/or other signal processing technique to combine simultaneously gathered data from multiple sensors to form a higher quality version of the sensor measurement being made.

Figure 10:
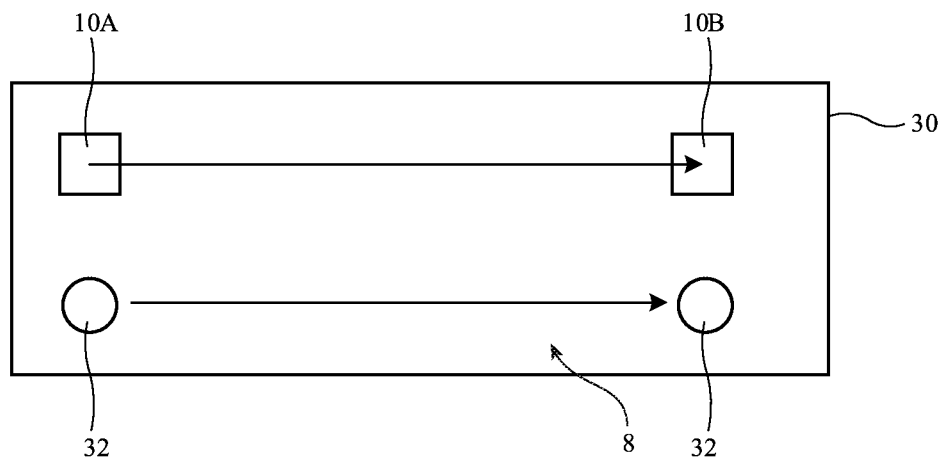
FIG. 10 is a diagram of an illustrative system with multiple electronic devices showing how the device that is being used to provide output may be switched in accordance with an embodiment.

FIG. 10 shows how object 32 (e.g., a person) may move within environment 30. A user may, as an example, move from one portion of a room where the user is adjacent to device 10A to another portion of the room where the user is adjacent to device 10B. System 8 may adjust the output device(s) used in presenting the user with output based on the user's location. As an example, devices 10A and 10B may have sensors (image sensors, proximity sensors, other optical sensors, radio-frequency sensors, ultrasonic sensors, etc.) that track the position of the user in real time, so that system 8 may provide the user with output that is based on the user's position. The user may, as an example, be viewing an image on a display in device 10A. Device 10B may have a display that is off while the user is viewing the image on device 10A. In response to detecting that the user has moved from a position adjacent to device 10A to a position adjacent to device 10B, system 8 may automatically switch the presentation of the image from the display of device 10A to a display in device 10B. This allows the user to move from one portion of a room (or portion of a building or other environment) to another while seamlessly viewing content on whichever device is closest to the user.

Still and/or moving images, audio, haptic output, and/or other output may be moved between the devices in system 8 in this way, if desired. If the output capabilities of one device are different than the output capabilities of another device, the format in which the output is provided may be adjusted accordingly. For example, if one display is a color display and another display is a black-and-white display, system 8 may display a color image on the color display and may display a black-and-white version of this image on the black-and-white display.

Figure 11:
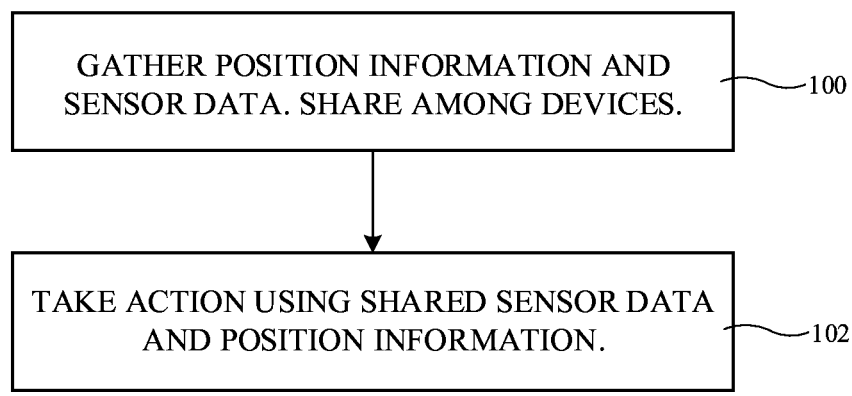
FIG. 11 is a flow chart of illustrative operations involved in using a system with multiple electronic devices in accordance with an embodiment.

Illustrative operations involved in operating system 8 are shown in FIG. 11. System 8 may have two or more devices 10 that communicate with each other. To ensure satisfactory corporation and communication between devices 10, a user may, if desired, register each of devices 10 with a shared service (e.g., an online service implemented on an online server that maintains information such as device type information, device identifiers, user identifiers, encryption keys for secure communications, etc.). The registration process (if desired) may be used to help enhance security when devices 10 of system 8 communicate with each other. During registration and/or later, during use of devices 10 in operating environment 30, devices 10 may exchange information such as device identifiers, resource lists (e.g., lists of available sensors 16 and other input-output devices 22 in each device), encryption keys, and/or other information about devices 10.

After optionally registering devices 10, one or more users may use devices 10 of system 8 within operating environment 30.

During the operations of block 100, one or more devices 10 may use sensors 16 to determine the positions of devices 10 within environment 30. This position information may then be shared among some or all of devices 10. With one illustrative arrangement, each device 10 is provided with radio-frequency circuitry (e.g., Ultra Wideband circuitry, sometimes referred to as UWB sensor circuitry) for determining the positions of other devices 10. The position measurements made by one or more devices 10 can be shared and a position map of devices 10 within system 8 may be created. Another way of mapping the positions of devices 10 involves using three-dimensional image sensor measurements. One or more of devices 10 may, as an example, have a three-dimensional sensor (e.g., a depth sensor formed from a stereo pair of image sensor and/or a depth sensor such as a structured light sensor). As one example, a head-mounted device may be provided with a three-dimensional image sensor. As the user of the head-mounted device moves about environment 30, the three-dimensional image sensor may gather three-dimensional images of environment 30 (including each of devices 10, objects 32, and obstructions 34 that are present in the environment). This three-dimensional image data (and/or other data such as two-dimensional images, etc.) may then be used to construct a three-dimensional map of environment 30 including the positions of devices 10, objects 32, and obstructions 34. Device position information (and, if desired, object and obstruction position information) can also be gathered using ultrasonic sensor measurements, magnetometer (magnetic sensor) measurements, measurements made with satellite navigation system circuitry (e.g. a Global Positioning System receiver), etc. In general, any suitable optical measurements, radio-frequency measurements, audio measurements, and/or other measurements of devices 10 and objects 32 may be made and any suitable processing techniques may be used to process these measurements to produce a map with the positions (locations in X, Y, and Z and angular orientations), sizes, shapes, and/or other characteristics of devices 10, objects 32, and/or obstructions 34. As an example, audio measurements, optical and/or radio-frequency measurements, measurements made using ultrasonic position sensing, mapping based on time-of-flight measurements (optical and/or acoustic), measurements made using radio-frequency circuitry such as UWB circuitry, and/or other measurements may made during the operations of block 100. If desired, devices 10 may communicate with each other to share information on the sensor capabilities and/or other input-output resources of each device 10. After sharing position information, information on the input-output device(s) present in each device 10, and/or other information, devices 10 can use their sensor(s) 16 to make measurements and/or other input-output devices may be used (e.g., sensor readings on object 32 may be made). Sensor measurements may then be shared between some or all of devices 10 in system 8, as described in FIGS. 1-10.

The sensors that are used in making measurements may be selected based on the position information (e.g., the three-dimensional map of devices 10, objects 32, and obstructions 34 made by a head-mounted device three-dimensional image sensor and/or other sensor(s) 16). For example, if a head-mounted device determines that microphone and image sensor measurements are impaired due to one or more obstructions, the head-mounted device may, using the known positions of devices 10 and their known resources, select a first device with a microphone that is near to object 32 and may select a second device with an image sensor that has a clear line of sight to object 32. The selected first device may use its microphone to gather audio for the head-mounted device and the selected second device may gather images that are displayed by the head-mounted device.

During the operations of block 102, one or more actions may be taken by one or more devices 10 in system 8 based on the shared sensor data of block 100. These actions may include sharing gathered data over local communications links in environment 30 and/or over remote communications links with other electronic devices (e.g., sharing sensed video and/or audio to remote devices over the Internet or other communications networks) and adjusting displays, speakers, and/or other output devices in input-output devices 22 of devices 10 (e.g., to adjust display brightness, color cast, to adjust speaker volume, to select between image sensor sources and/or audio sources, etc.). If desired, the sensor data from one or more sensors that are not obstructed by an obstruction may be used in place of the sensor data of one or more devices that are obstructed by an obstruction. For example, a device with a camera that is blocked by a wall can use the camera of another device that is not being obstructed to capture images of a desired object. Sensor data may be combined to enhance signal-to-noise ratios or to form three-dimensional images that using three-dimensional image data from multiple devices with different vantage points of an object. If desired, sensor data associated with noisy measurements and/or other undesired sensor data may be discarded and replaced with more satisfactory sensor data measured with other sensors. Sensor resources can be shared among devices so that, for example, a first device that is missing a given type of sensor can use that given type of sensor in a second device to make sensor measurements. These sharing operations may, if desired, take account of the positions of devices 10 in environment 30 and system 8. For example, when constructing a three-dimensional image of an object using sensor data from multiple devices, information on the vantage point from which each device captured a contributed portion of the three-dimensional image may be used in forming the combined final image. When the microphones of multiple devices 10 are combined to form a directional microphone array, position information on the microphones may be used in processing audio signals (e.g., microphone array position information may be used to allow triangulation operations to be performed in which the location of an audio source can be determined). If desired, other actions may be taken and/or other information may be used when using shared sensor data and device position information in system 8. The foregoing examples are illustrative.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A system operable in a room with an object and an obstruction, comprising:
   a first electronic device having a display and a first sensor that is prevented from sensing the object in the room by the obstruction; and
   a second electronic device having a second sensor, wherein the first and second sensors are both three-dimensional image sensors, wherein the second electronic device is in wireless communication with the first electronic device, wherein the first electronic device is configured to sense the object in the room with the second sensor, and wherein at least one of the first and second electronic devices comprises a head-mounted device.

2. The system defined in claim 1, wherein the obstruction comprises a wall in the room and wherein the first electronic device is configured to sense the object by capturing an image of the object with the second sensor.

3. The system defined in claim 2 wherein the first and second electronic devices each comprise an electronic device selected from the group consisting of: a computer, a cellular telephone, a wristwatch, and a head-mounted device.

4. The system defined in claim 1 wherein the first electronic device is configured to use the second sensor based on a map of the room that includes the positions of the first and second electronic devices, wherein the map indicates that the second sensor is not obstructed by the obstruction.

5. The system defined in claim 4 wherein the map of the room comprises position information on the object and the obstruction.

6. The system defined in claim 5 wherein the map comprises a three-dimensional map gathered with a head-mounted device three-dimensional image sensor.

7. The system defined in claim 6 wherein the head-mounted device includes the head-mounted device three-dimensional image sensor.

8. A system operable in a room of a building that contains an object, comprising:
- a head-mounted device, wherein the head-mounted device has a sensor configured to determine electronic device positions within the room;
- a first electronic device in wireless communication with the head-mounted device and having a first sensor; and
- a second electronic device in wireless communication with the head-mounted device and having a second sensor, wherein the head-mounted device is configured to gather sensor data on the object with the first sensor and the second sensor, wherein the head-mounted device is configured to select the first sensor in the first electronic device for use in gathering sensor data and to select the second sensor in the second electronic device for use in gathering sensor data based on the electronic device positions.

9. The system defined in claim 8 wherein the first sensor comprises an image sensor that captures an image of the object and wherein the head-mounted device has a display configured to display the image.

10. The system defined in claim 9 wherein the second sensor comprises a microphone configured to measure sound from the object.

11. The system defined in claim 10 wherein the head-mounted device has a speaker configured to play the sound.

12. The system defined in claim 11 wherein the electronic device positions comprise a first position of the first electronic device within the room and a second position of the second electronic device within the room, wherein the sensor in the head-mounted device comprises an image sensor, and wherein the head-mounted device is configured to determine the first and second positions by using the image sensor as the head-mounted device is moved through the room.

13. A system operable in a room of a building that contains a source of sound, comprising:
- a head-mounted device with a display configured to present visual content; and
- an electronic device that is in wireless communication with the head-mounted device, wherein the electronic device has a microphone that measures the sound, wherein the head-mounted device is configured to receive the measured sound from the electronic device, and wherein the head-mounted device is configured to determine device positions within the room using an image sensor and is configured to use the device positions in selecting the microphone of the electronic device to receive the measured sound.

14. The system defined in claim 13 wherein the electronic device comprises an electronic device selected from the group consisting of: a cellular telephone, a wristwatch device, and a computer.

* * * * *